Patented Feb. 20, 1940

2,191,365

UNITED STATES PATENT OFFICE 2,191,365

PROCESS FOR PURIFYING SUGAR JUICES AND SOLUTIONS

Robert Boyd, Vancouver, British Columbia, Canada

No Drawing. Application April 12, 1938, Serial No. 201,638

7 Claims. (Cl. 127—46)

This invention relates to a process for purifying sugar juices and solutions in the production of sugar, sugar products, syrups and molasses.

An object of the present invention is the provision of a process for increasing the amount of sugar recovered from impure sugar solutions.

Another object is the provision of a process adapted to improve the colour and appearance of sugar, sugar products, syrups and molasses.

A further object is the provision of a process adapted to improve the flavour of sugar products, syrups and molasses.

A further object is the provision of a process for purifying sugar juices and solutions which may be carried on by itself or in conjunction with the normal processing of the sugar juices and solutions.

There are many known methods and processes for purifying sugar juices but these are only partially successful. At the present time, raw sugar, sugar-cane juice and sugar-beet juice are processed to remove as many of the objectionable substances contained therein as possible but there are certain well recognized impurities left which heretofore it has been impractical to remove. The present process is designed to remove a great deal of the impurities that the known processes do not take out and, at the same time, to remove the impurities that may be taken out by the known processes. These impurities are well known in the sugar industry.

In the following description sucrose (commonly termed cane-sugar, whether derived from cane, beets or other sources) is specifically referred to, but it is to be understood that the invention is not limited to sucrose and its products but applies also to other sugars and their products, for example, dextrose, glucose, corn syrup and levulose.

Sucrose as it is found in nature is associated with other substances and some of these are removed in the course of manufacture and/or refining by well known methods, such as treatment with lime, with or without subsequent carbonation, filtration, sulphitation, bone-char and vegetable carbon treatment, crystallization, etc. Some of the objectionable substances referred to are not removed by any of these processes and are found in the final products where they give rise to increased molasses-production and to objectionable color, odor and taste.

As a specific illustration the production of yellow (soft) sugars may be considered. These sugars are boiled from solutions obtained in the regular refinery operations from raw cane-sugar and they contain sucrose and invert sugar along with varying amounts of inorganic and organic compounds some of which are highly coloured; the relative amounts and character of these compounds depend upon the type of raw sugar being refined. Some of these compounds are desired for conferring a yellow or brown color to the sugar while others are undesirable imparting unattractive color tones to the product. One application of the invention is to remove these objectionable substances and so obtain a product with good color characteristics or "bloom" as it is termed in the industry.

Another specific application of the invention is to the beet-sugar industry where compounds occur in the beet juice which are dark in color and possess a disagreeable taste and odor. An object of the invention is to remove these objectionable compounds from the beet juice thereby increasing the purity of the juice and thus facilitate the production of a purer white sugar, obtain a better yield of sugar and a better quality of final molasses.

This invention may equally well be applied to other branches of the sugar, syrup and molasses industries.

This invention consists essentially in the treatment of the sugar solution to be purified with a certain type of synthetic or semi-synthetic resin. These resins are insoluble organic compounds derived from catechol-tannins such as cutch, quebracho, gambier, etc., by the action of concentrated sulphuric acid or anhydrous oxalic acid, or sulphur, or alkali sulphides. The resins so formed may be or may not be further treated with aldehydes; in some cases this latter treatment increases the insolubility of the resin. The resin may be obtained in various physical states, such as, for example, in gelatinous, powder or granular form, by varying the conditions under which the condensation takes place. Any one or any combination of these forms may be used in carrying out the invention, the form or combination of forms employed depending upon the degree of activity required in the purification of the sugar solution. The more finely divided the resin is the more activity it shows in removing impurities from sugar solutions; the gelatinous form shows the greatest activity and becomes less active after drying. A particularly active and suitable type of resin is obtained as follows: one part of cutch crushed to a coarse power is added to three parts of sulphuric acid with stirring and the temperature of the mixture held around 80° to 85° C. for one-half-hour. The reaction causes the cutch to resinify but the resin so formed is not sufficiently insoluble in boiling water for the purpose of this invention. To harden the resin and render it more insoluble the mixture of cutch and acid is poured into ten parts of an approximately one per cent solution of formaldehyde. The resin is then filtered off and washed with water.

A hard granular form may be obtained by intimately mixing one part anhydrous oxalic acid with three parts powdered cutch and heating the mixture to around 105° C. for several hours. The resinified product is washed free from oxalic acid with water and crushed to the desired particle size.

These resins have been found to have the property of removing objectionable substances found associated with sugar when brought into contact with solutions containing such substances. Thus, when the solution from which "yellow" or "brown" sugar is to be boiled is treated with a synthetic resin of the type described, the substances which impart the undesirable shades are removed and sugars with an excellent "bloom" are obtained. At the present time, it is common practice to add a mineral acid to the soft sugars in an effort to improve the colour thereof but the results are unsatisfactory in various ways.

The resin treatment may be introduced as an additional process at any stage in the present methods of sugar manufacture or it may be used to displace one or more of existing methods. For example, a solution may be refined as much as present methods permit and then be given an additional treatment with the synthetic resin or the resin treatment may entirely or in part replace the use of bone-char as a purifying agent.

The application of the invention may be made in various ways; for example, the resin may be added to the solution, mixed throughout the mass and later filtered off, or the solution may be percolated through a porous mass of the resin, or the solution may be forced under pressure through layers of the resin. This invention is not limited to any or all of these methods of application.

The treatment of the sugar solutions may be carried out over a wide range of temperature, density and acid-alkalinity reaction. In the refining of cane-sugar good results are obtained at 70° C. to 80° C. with solutions of 60 degrees Brix and a pH value about 7, but these values may be varied widely to suit other conditions.

The amount of resin required to purify a solution depends upon a number of factors, such as the physical state of the resin used, the amount and the character of the impurities to be removed.

An important feature of the invention is that the resin may be regenerated after use for further service without any substantial loss either in amount or in activity. This regeneration may be accomplished by washing with dilute acids, alkalies, saline solutions and with water. Water alone removes some of the substances absorbed by the resin while acid or saline solutions are required to remove others.

The following is an example of one way in which the present invention may be used in the refining of cane-sugar:

Granulated syrup, (that is, syrup from which granulated sugar has been separated in the usual refinery operations), is taken at a suitable purity, normally around 80 to 85 purity quotient and the density is adjusted to about 60 degrees Brix. This syrup is filtered with the aid of diatomaceous earth to give a clear liquor. To this clear liquor, synthetic resin of the type described is added in amount corresponding to approximately five to ten percent resin on the total solids in solution in the liquor; the resin is well stirred into the liquor while the temperature is maintained about 75 degrees centigrade. After the resin has been in contact with the liquor for over ten minutes it is removed by filtration in any suitable type of filter. The filtrate, improved in color and in purity as a result of the resin treatment, is sent to a vacuum pan to be boiled into a "soft" sugar. The resin is removed from the filter and added to a quantity of affination syrup. This affination syrup is produced in the normal operation of a sugar refinery and consists of material removed from the raw sugar by a washing process. It contains the greater part of the impurities originally present in the raw sugar and therefore is a much lower grade material than the granulated syrup already treated with the resin; consequently, the once used resin can be used advantageously on this affination syrup from which it can remove much of the impurities, both inorganic and organic in nature. It is desirable to subject the affination syrup to a preliminary cloth filtration with the aid of diatomaceous earth so as to remove all suspended insoluble particles. The resin already used on the granulated syrup is added to the affination syrup in the proportion of about three parts resin to one hundred solids in solution in the affination syrup, and the two are kept in contact for ten minutes or longer at a temperature of about 75 degrees centigrade. The resin is now separated from the affination syrup by filtration. The affination syrup is greatly improved in color and purity as a result of the treatment and so may be sent directly to a vacuum pan to be boiled into a brown "soft" sugar, or it may be further treated in the refinery according to present methods. The resin which has now been used twice is heavily loaded with impurities removed from the sugar-liquors and also contains some sugar in the form of liquor adhering to it. This sugar is first removed by washing with the necessary amount of water, then the resin is acted upon by dilute muriatic acid followed by prolonged washing with water. This treatment regenerates the resin which is now returned to be used with a further batch of granulated syrup, thus commencing a new cycle of operation.

In the above example the resin is used twice, that is, on two different refinery products before being regenerated; the weight of impurities removed may amount to 15 to 20% of the weight of the resin used. In the economic application of the invention it is desirable to have the resin as heavily loaded with impurities as practical before regeneration but the loading may be accomplished by one, two or more applications according to the character of the product or products being treated. When more than one product is to be treated it is, in general, advisable to add the resin first to the one with the least coloring matter and afterwards to the others in the order of increasing color concentration; the application of the invention is not however limited to this order. When it is desired to transfer color from one product to another the reverse order may be used.

It has been found that the sugar adhering to the resin after the resin has been used for the purpose of this invention, may be removed by careful leaching with water before the absorbed impurities are washed out of the resin to any great extent; the sweetwater thus produced lends itself to the economical recovering of the sugar.

The following is an example of an application of the present invention in the manufacture of beet sugar:

This process consists in treating the diffusion juices from beet cossettes with lime and carbonic acid to remove as many of the undesirable impurities as possible. Then the juices are further treated with a resin derived from a catechol-tannin in the manner described, after which the juices are concentrated and the sugar separated therefrom in the usual manner. This resin treatment removes a great deal of the impurities that it has been impractical to remove up to the present time.

Certain synthetic resins have been used to remove impurities from liquids but, heretofore, there has not been a synthetic resin produced that has been used to remove the objectionable impurities from sugar solutions in a practical manner. Many of the known resins are at least partially soluble in boiling water and, therefore, they would impart undesirable substances to the sugar solutions. Up to the present time, the sugar industry has been unable to eliminate certain impurities from the sugar solutions since there was no known process or substance by means of which the objectionable impurities could be removed in a practical manner.

Synthetic resins produced in accordance with the present invention are extremely active and insoluble whereby they are capable of removing substantially all the objectionable impurities from sugar solutions in a practical and economical manner.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A process of purifying sugar solutions which consists in treating the solution with a resin derived from a catechol-tannin by treatment with concentrated sulphuric acid.

2. A process of purifying sugar solutions which consists in treating the solution with a resin derived from a catechol-tannin by treatment with concentrated sulphuric acid and then with a dilute aldehyde solution.

3. A process of purifying sugar solutions which consists in treating the solution with a resin derived from a catechol-tannin by treatment with concentrated sulphuric acid and then with formaldehyde.

4. A process of purifying sugar solutions which consists in treating the solution with a resin derived from a catechol-tannin by treatment with concentrated sulphuric acid at a temperature of from 80° to 85° C., then adding to a substantially 1% solution of formaldehyde and filtering off and washing with water.

5. A process for producing soft sugars of improved appearance which consists in treating sugar refinery liquors with a resin derived from catechol-tannins and concentrated sulphuric acid followed by evaporation and subsequent separation of the sugar from the accompanying syrup.

6. A process for refining raw sugar which consists in washing the raw sugar, removing insoluble material from the washings and then treating the washings with a resin derived from a catechol-tannin by treatment with concentrated sulphuric acid.

7. A process for the manufacture of beet sugar which consists in treating the diffusion juice from beet cossettes after initial purification with lime and carbonic acid with a resin derived from a catechol-tannin and concentrated sulphuric acid, the treated juice being subsequently concentrated and the sugar separated in the usual way.

ROBERT BOYD.